Aug. 30, 1932.  R. B. BUKOLT  1,874,437
TOY VEHICLE
Original Filed Oct. 19, 1928
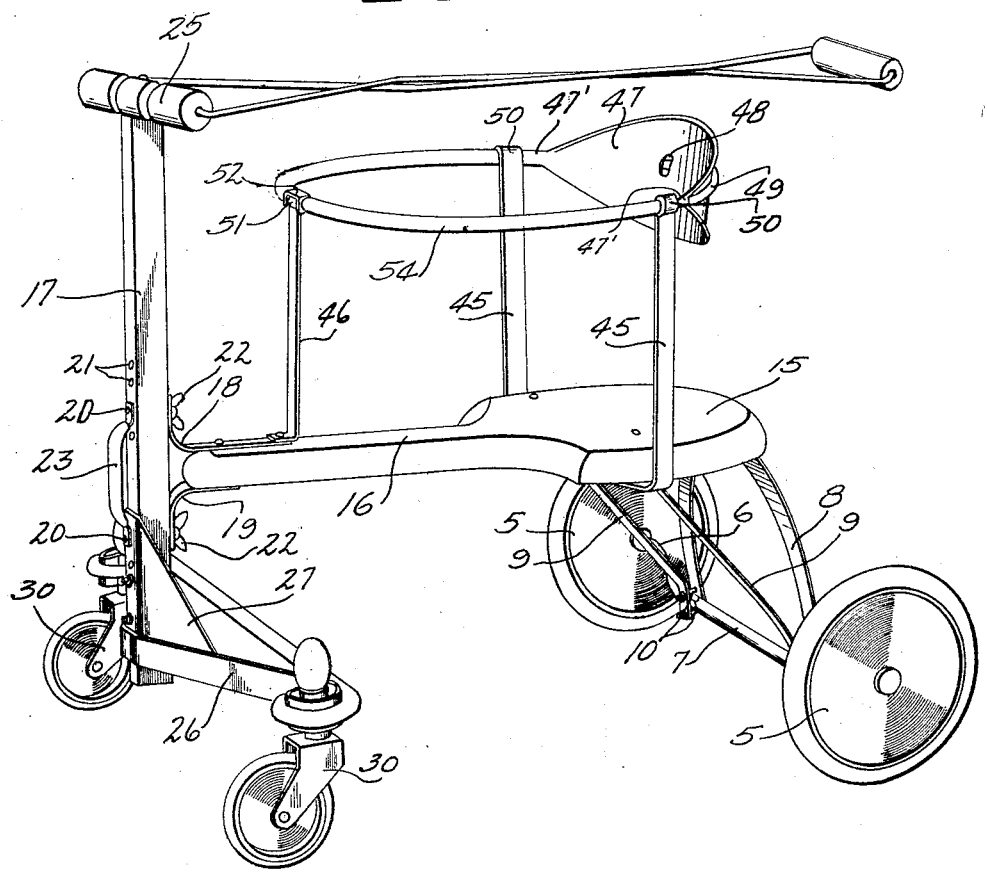
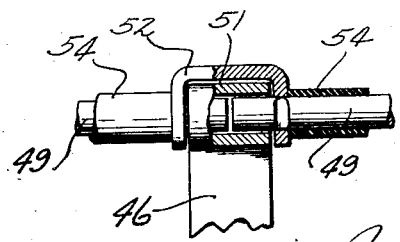
Inventor
Roman B. Bukolt
By Wheeler, Wheeler & Wheeler
Attorneys Patented Aug. 30, 1932

1,874,437

UNITED STATES PATENT OFFICE

ROMAN B. BUKOLT, OF STEVENS POINT, WISCONSIN

TOY VEHICLE

Original application filed October 19, 1928, Serial No. 313,414. Divided and this application filed October 28, 1929. Serial No. 402,899.

This invention relates to improvements in toy vehicles.

This is a division of my co-pending application, Serial No. 313,414, Filed October 19, 1928.

It is the primary object of the present invention to provide a novel and improved back rest and confining ring assembly for supporting a young child on the seat portion of the vehicle.

In the drawing:

Figure 1 is a view in perspective of a toy vehicle embodying this invention.

Figure 2 is a fragmentary detail partially in front elevation and partially in section showing the front bracket and the hoop supported thereby.

Like parts are identified by the same reference characters throughout both views.

The rear wheels 5 are rotatably mounted upon the crank-like end portions 6 of a rear axle 7 which is squared, as shown in Figure 1, at the points of engagement therewith of the legs of the U-shaped seat support 8 and the braces 9. It will be noted that each brace is bolted to one of the legs of the seat support 8 at each side of the squared axle by means of bolts 10 whereby the axle is clamped between the braces and support to secure it against rotation. It will be obvious that this arrangement permits of the adjustment of axle 7 to angular positions adapted to provide a plurality of levels at which said support and braces will be carried.

The vehicle seat is provided with an elongated forward extension 16 which terminates short of the front post 17 of the vehicle and is detachably connected therewith by the fittings 18 and 19 which are apertured to receive bolts 20 selectively engageable in a number of openings 21 in the front post 17 and preferably provided with wing nuts 22. The heads of the bolts serve to secure to the front of post 17 a bumper 23 which will cushion encounters of the vehicle with furniture which is too high to be struck by the combined bumper and foot rest hereinafter to be described. Bumper 23 may also be used as a handle by which an adult may carry the vehicle. The ends of the bumper or handle 23 may be used in place of washers to prevent the heads of bolts 20 from abrading the wood of which front post 17 is shown to be constructed.

Although the front post 17 is extended upwardly and provided with a transverse handle at 25, it is not dirigible and it carries rigidly the strap iron axle member 26 which is connected thereto and braced therefrom by means of the sheet metal brace 27 which is of general triangular form and, like the axle member 26, is bent rearwardly when the parts are disposed as shown in Figure 1.

The axle 26 is composed of two strap iron arms which are not in alignment but are arranged to project forwardly of the front post 17 when the post is turned to hold the bumper forwardly and rearwardly when the post is reversed, as shown in Figure 1. The extremities of axle 26 are helically curled to receive the shanks of caster wheels 30 which permit the child to control the direction of movement of the vehicle without requiring a dirigible axle.

The bolts which anchor braces 9 to seat 15 also secure to the under side of the seat the bracket elements 45 which are vertically disposed at either side thereof. A third bracket 46 is mounted at the front of the seat upon its narrow portion 16 or is otherwise supported from the front post 17. A back for the seat is provided by a sheet metal stamping 47 pressed outwardly at 48 to receive a wire 49 which passes through eyes 50 formed by reversely bending the ends of brackets 45 back upon themselves. The seat back 47 tapers toward its side portions and is also formed about the wire at 47'. The ends of the wire are carried forwardly and abut within a similar eye 51 formed in bracket 46, as shown in Figure 2. A C-shaped clamp 52 has its ends apertured to receive the ends of the wire 49 and is compressed thereon to anchor the wire in place. This construction leaves no exposed ends and provides a comparatively rigid support not only for the back of the seat but also a support in the form of a ring which prevents a small child from falling forwardly.

The entire supporting structure including brackets 45 and 46, seat back 47, and the guard ring 49 may readily be removed from the vehicle as the child develops to a stage where the protection thus afforded is unnecessary. The wire 49 is preferably covered with a rubber tube 54 between bracket 46 and each of brackets 45.

It is particularly to be noted that the entire supporting structure is free of that portion of the seat which is occupied by a child and even permits the child's body to overhang the seat slightly while providing adequate support for the back.

I claim:

1. In a device of the character described, the combination with a seat and brackets at the sides thereof, of a bracket at the front thereof, a wire hoop supported upon said bracket and provided with ends joined at one of said brackets, and a back support extending across the rear portion of said seat and connected with said hoop.

2. In a device of the character described, the combination with a vehicle seat of a pair of side brackets secured to the under side of said seat and extending upwardly at either side thereof, a front bracket disposed in advance of said seat, a wire mounted upon said brackets and provided with ends joined at said front bracket, means enclosing said ends, and a stamped sheet metal back for said seat secured upon said wire and extending transversely above said seat between said side brackets.

3. In a device of the character described, the combination with a seat and a set of supporting brackets, of a wire hoop mounted in said brackets to encircle a portion of said seat, and a back member formed to engage said wire at a plurality of points and wholly supported therefrom.

4. In a vehicle of the class described having a seat, the combination with brackets secured to the sides of said seat and a bracket secured to the front of said seat and provided with an eye, of a single wire passing around said seat supported by said brackets and having its ends inserted in said eye, and a clamp engaging said wire adjacent said ends, whereby to secure said wire to the front bracket.

ROMAN B. BUKOLT.